(12) United States Patent
Kilgore et al.

(10) Patent No.: US 7,685,562 B2
(45) Date of Patent: Mar. 23, 2010

(54) METHOD AND CODE GENERATOR FOR INTEGRATING DIFFERENT ENTERPRISE BUSINESS APPLICATIONS

(75) Inventors: William Bruce Kilgore, Tempe, AZ (US); Daniel Kearns, Chicago, IL (US)

(73) Assignee: Siebel Systems, Inc., San Mateo, CA (US)

( * ) Notice: Subject to any disclaimer, the term of this patent is extended or adjusted under 35 U.S.C. 154(b) by 799 days.

(21) Appl. No.: 10/120,031

(22) Filed: Apr. 9, 2002

(65) Prior Publication Data
US 2007/0226682 A1  Sep. 27, 2007

Related U.S. Application Data

(63) Continuation of application No. 09/968,458, filed on Sep. 28, 2001, now abandoned.

(51) Int. Cl.
*G06F 9/44* (2006.01)
*G06F 9/45* (2006.01)

(52) U.S. Cl. .................. 717/107; 717/114; 717/143

(58) Field of Classification Search ......... 717/105–168, 717/100
See application file for complete search history.

(56) References Cited

U.S. PATENT DOCUMENTS

| | | | |
|---|---|---|---|
| 5,432,925 A | 7/1995 | Abraham et al. | 395/500 |
| 5,497,491 A | 3/1996 | Mitchell et al. | 719/315 |
| 5,542,078 A | 7/1996 | Martel et al. | 707/101 |
| 5,809,507 A | 9/1998 | Cavanaugh, III | 707/103 R |
| 5,958,004 A | 9/1999 | Helland et al. | 718/101 |
| 6,125,383 A | 9/2000 | Glynias et al. | 709/202 |
| 6,253,367 B1 | 6/2001 | Tran et al. | 717/108 |
| 6,378,003 B1 | 4/2002 | Danforth | |
| 6,453,356 B1 | 9/2002 | Sheard et al. | 709/231 |
| 6,574,635 B2 | 6/2003 | Stauber et al. | 707/103 R |
| 6,601,072 B1 | 7/2003 | Gerken, III | 707/103 R |
| 6,633,889 B2 | 10/2003 | Dessloch et al. | 707/103 Y |
| 6,654,801 B2 | 11/2003 | Mann et al. | 709/224 |
| 6,668,254 B2 | 12/2003 | Matson et al. | 707/10 |

(Continued)

FOREIGN PATENT DOCUMENTS

EP        1 030 254        8/2000

(Continued)

OTHER PUBLICATIONS

"The Java syntactic extender (JSE)", Bachrach et al., Dec. 2001, pp. 31-42. Online retrieved at <http://delivery.acm.org/10.1145/510000/504285/p31-bachrach.pdf>.*

(Continued)

*Primary Examiner*—Tuan Q Dam
*Assistant Examiner*—Thuy Dao
(74) *Attorney, Agent, or Firm*—Campbell Stephenson LLP

(57) ABSTRACT

A method and code generator system for integrating different enterprise business applications is disclosed. In one embodiment, a method for integrating a local business system with an external business system, comprises using a code generator to generate integration source code, wherein using a code generator comprises; interrogating a repository containing integration data by an introspector; and using the integration data with a code filter, wherein the filter generates the integration source code.

37 Claims, 5 Drawing Sheets

U.S. PATENT DOCUMENTS

| | | | |
|---|---|---|---|
| 6,742,175 B1* | 5/2004 | Brassard | 717/107 |
| 7,051,316 B2* | 5/2006 | Charisius et al. | 717/103 |
| 7,257,820 B2 | 8/2007 | Fischer et al. | 719/316 |
| 2002/0091990 A1* | 7/2002 | Little et al. | 717/105 |
| 2002/0095651 A1* | 7/2002 | Kumar et al. | 717/104 |
| 2002/0116698 A1* | 8/2002 | Lurie et al. | 717/100 |
| 2002/0133812 A1* | 9/2002 | Little et al. | 717/140 |
| 2004/0015832 A1* | 1/2004 | Stapp et al. | 717/106 |
| 2004/0015857 A1* | 1/2004 | Cornelius et al. | 717/120 |
| 2004/0060036 A1* | 3/2004 | Natori et al. | 717/100 |
| 2005/0160398 A1* | 7/2005 | Bjornson et al. | 717/104 |
| 2006/0015862 A1* | 1/2006 | Odom et al. | 717/168 |

FOREIGN PATENT DOCUMENTS

| | | |
|---|---|---|
| EP | 1 122 652 | 8/2001 |

OTHER PUBLICATIONS

"An agent-based approach for building complex software systems", N. Jennings, Apr. 2001, pp. 35-41. Online retrieved at <http://delivery.acm.org/10.1145/370000/367250/p35-jennings.pdf>.*

"Difficulties in integrating multiview development systems", S. Meyers, Jan. 1991, pp. 49-51. Online retrieved at <http://ieeexplore.ieee.org/stamp/stamp.jsp?tp=&arnumber=62932&isnumber=2296>.*

V. Y. Lum et al.; "A General Methodology for Data Conversion and Restructuring;" IBM Journal of Research and Development; International Business Machines Corp.; New York, NY; V. 20; No. 5; (Sep. 1, 1976); pp. 483-497.

Sybase; "PowerDesigner® WarehouseArchitect™ The Model for Data Warehousing Solutions;" Sybase Technical Paper; (Mar. 29, 1999); pp. 2-19.

* cited by examiner

METHOD AND CODE GENERATOR FOR INTEGRATING DIFFERENT ENTERPRISE BUSINESS APPLICATIONS

The present patent application is a continuation of prior application Ser. No. 09/968,458 filed Sep. 28, 2001 now abandoned, entitled METHOD AND CODE GENERATOR SYSTEM FOR USING INTEGRATING DIFFERENT ENTERPRISE BUSINESS APPLICATIONS.

FIELD OF THE INVENTION

This invention relates to computer systems, and more specifically to a method and code generator for integrating different enterprise business applications.

BACKGROUND OF THE INVENTION

According to one observer, if the lifeblood of today's corporations is information, then their arteries are the "inter-application interfaces" that facilitate movement of data around the corporate enterprise. This has more recently become known as an "application network".

For the typical organization, the application network has grown organically into a collection of ad hoc application integration programs. This menagerie has had a very serious impact on businesses as it increases the time for implementing new applications, prevents senior management from getting a clear picture of the business and, in short, clogs the corporate arteries. In spite of the fact that application integration has become crucial to a competitive corporation's survival, it has nevertheless been acceptable in the prior art to handcraft or "hack" custom code for such purposes at enormous long-term cost to the corporation. Long-term application integration decisions have, likewise, been made at the lowest possible levels based solely on individual project criteria. Because of the decidedly difficult nature of these problems, an effective enterprise application integration (EAI) solution has yet to be found.

The advent of the Internet, client/server computing, corporate mergers and acquisitions, globalization and business process re-engineering, have together forced corporate information technology (IT) departments to continually seek out new, and often manual, ways to make different systems talk to each other—regardless of how old some of those systems may be. In the ensuing chaos, inadequate communications systems have had a debilitating effect on IT's abilities to move as fast as the business needs it to.

On the other hand, typical ERP systems are essentially large, integrated packaged applications that support core business functions, such as payroll, manufacturing, general ledger, and human resources. Implementing an ERP system, however, can be an overwhelming process for a number of reasons.

First and foremost, the corporation is buying a product and not building a solution. This means that business units within the corporation must adapt to the product and how it works, not the other way around. Furthermore, today's ERP systems cannot replace all of a corporation's custom solutions. They must, therefore, communicate effectively with other legacy systems in place. Finally, it is not atypical for a corporation to employ more than one and completely different ERP system because a single vendor cannot usually meet every organizational need.

As a result, the options for getting data into and out of an ERP system preclude known approaches used for data warehousing. Each ERP system has a proprietary data model that is constantly being enhanced by its vendor. Writing extract or load routines that manipulate such models is not only complicated, but is also discouraged by the vendor since data validation and business rules inherent in the enterprise application are likely to be bypassed. Instead, ERPs require interaction at the business object level, which deals with specific business entities such as general ledgers, budgets or accounts payable.

FIG. 1 illustrates a block diagram of a prior art integration system 100 having two different business systems. Local business system 105 represents an ERP business environment, such as those described above, for example a system using the JAVA® environment or SAP® environment. JAVA® is a registered trademark of Sun Microsystems, Inc. SAP® is a registered trademark of SAP Aktiengesellschaft. External business system 125 is an ERP business environment as well, however external system 125 is of a different environment than local system 105; for example a SIEBEL® Business system or Integration Object environment. SIEBEL® is a registered trademark of Siebel Systems, Inc. A problem arises when a user of local system 105 wishes to access external systems 125 within the environment of local system 105. Prior art system 100 solves this problem by having human developer 145 spend hundreds of hours to develop integration code 155. Integration code 155 allows local system 105 to invoke external systems 125 from the local environment. Hand coding by human developer 145 is very expensive, and inefficient because, it may only be used for external system 125. If a second external business system needs to be accessed, human developer 145 must generate new integration code 155. Often, the integration code does not provide a user a coherent interface, with an appearance of being native to local system 105.

In today's rapidly changing environment, the concerted efforts of thousands of developers worldwide are focused on developing a system that satisfies the need for disparate applications to communicate with each other, without the necessity of embedding multiple, customized application-specific translation schemes. This as yet unfulfilled need is grounded in the imperative of the global economy.

BRIEF DESCRIPTION OF THE DRAWINGS

The accompanying drawings, which are included as part of the present specification, illustrate the presently preferred embodiment of the present invention and together with the general description given above and the detailed description of the preferred embodiment given below serve to explain and teach the principles of the present invention.

DETAILED DESCRIPTION

Figure 1:
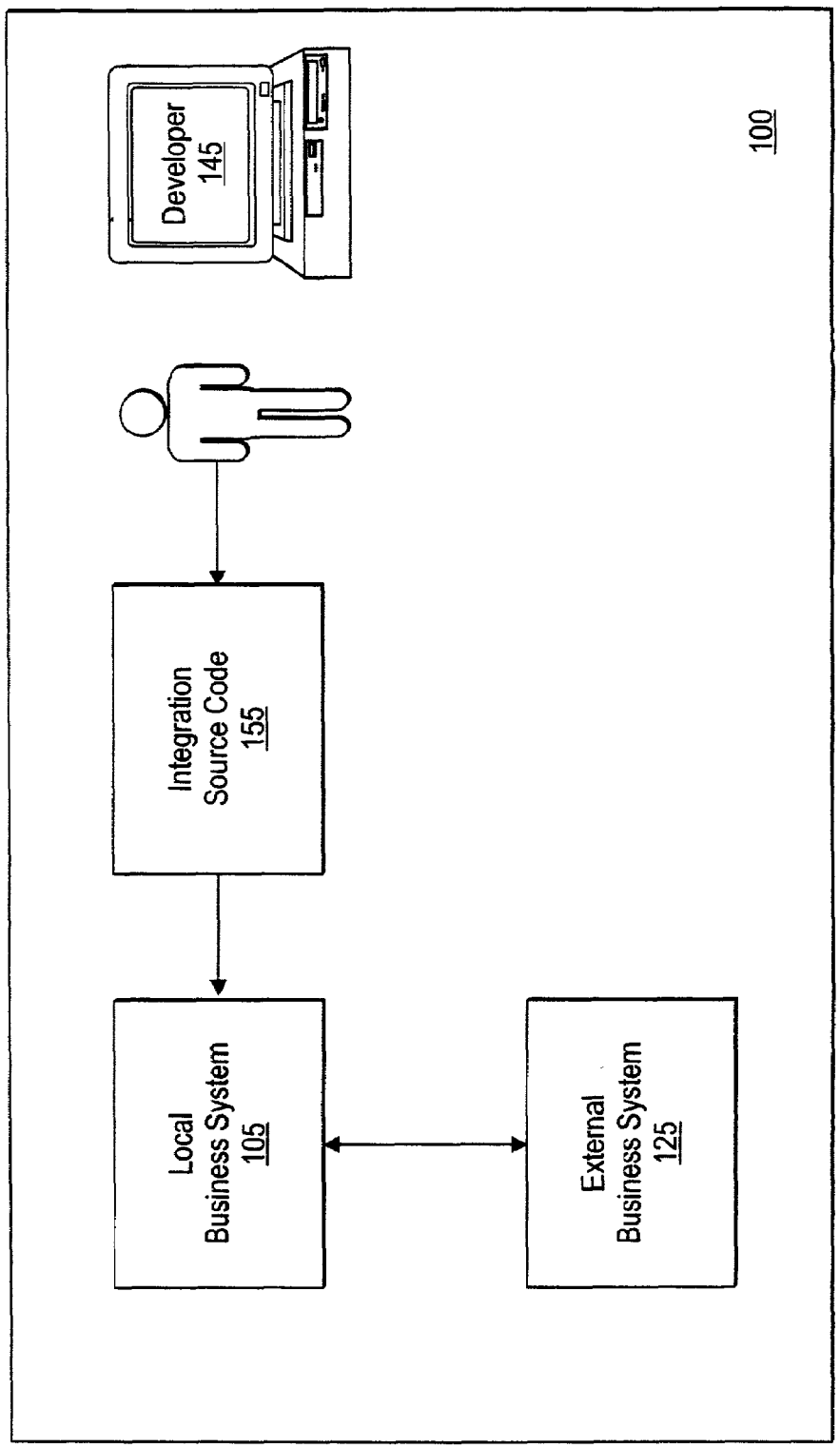
FIG. 1 illustrates a block diagram of a prior art integration system 100 having two different business systems.

A method and code generator system for integrating different enterprise business applications is disclosed. In one embodiment, a method for integrating a local business system with an external business system, comprises using a code generator to generate integration source code, wherein using a code generator comprises; interrogating a repository containing integration data by an introspector; and using the integration data with a code filter, wherein the filter generates the integration source code.

In the following description, for purposes of explanation, specific nomenclature is set forth to provide a thorough understanding of the present invention. However, it will be apparent to one skilled in the art that these specific details are not required in order to practice the present invention.

Some portions of the detailed descriptions, which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

Figure 2:
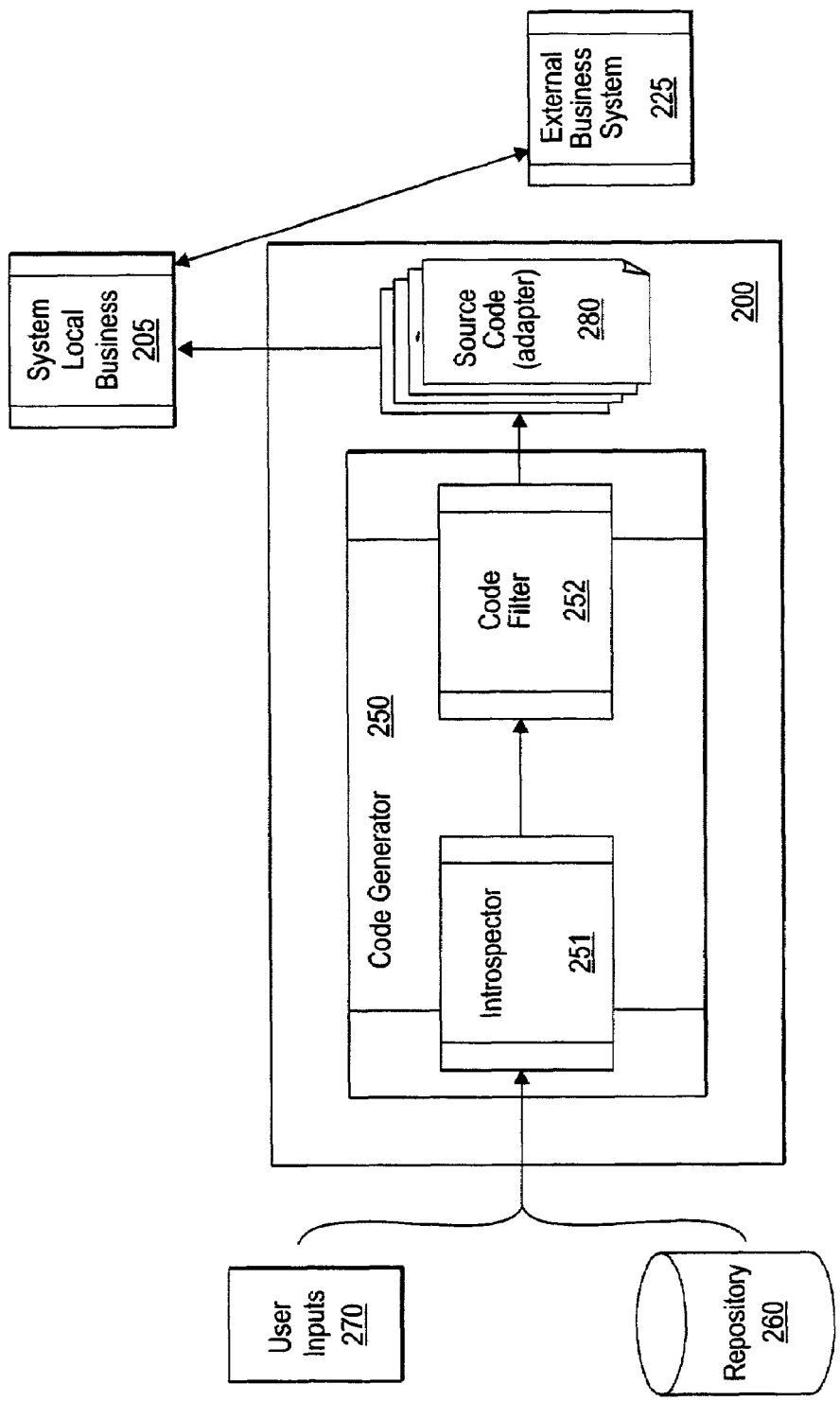
FIG. 2 illustrates a block diagram of an exemplary code generator system 200 according to one embodiment of the present invention.

FIG. 2 illustrates a block diagram of an exemplary code generator system 200 according to one embodiment of the present invention. Interacting with 200 are local business system 205 and external business system 225. The business systems may be ERP systems. In addition external business system 225 could be a service providing integration objects, such as described in commonly assigned U.S. patent application Ser. No. 09/968,735 entitled "Method and System for Using Integration Objects with Enterprise Business Applications," having inventors Jeffrey Michael Fischer and Mark Coyle, filed on Sep. 28, 2001; and is hereby incorporated by reference. An application running on local business system 205 can include an external application adapter and an internal application adapter. The external application adapter communicates with external integration interfaces, such as an external integration interface of external business system 225. The external application adapter creates a local representation of the external system's data objects without losing the meaning of the external data objects. The local representation is provided to a data transformation adapter. The names of fields within the local representation brought from external system are renamed to correspond with the naming conventions of local business system 205, in order to create a common representation of the external system's data objects. In addition an semantic differences between the object structures of local business system 205 and external business system 225 are resolved by the data transformation adapter. The common representation is provided to the internal application adapter. The internal application adapter communicates directly with an internal object layer of business system 205.

The core of code generator system 200 is code generator 250. Code generator 250 is a business service that provides the ability to yield integration code for customers to embed into their development environment for the purpose of integrating a local and external business system. Code generator 250 introspects (interrogates) repository 260 for pertinent information and depending on user inputs 270, generator 250 yields integration source code 280. Source code 280 is capable of being embedded in local system 205. Code generator 250 provides for the seamless (transparent to the user) integration of the services of external business system 225 into local business system 205. Although not required, code generator 250 may integrate systems, such as SIEBEL® Integration Objects and SIEBEL® Business Services into local system 205. SIEBEL® Integration Objects allow external systems (e.g., SAP®) to obtain or provide data to or from the SIEBEL® Application Environment. SIEBEL® Business Services provide standard or custom-built services for enterprise business. For example, SIEBEL® Business Services provide business logic based on a service's input and data maintained within SIEBEL®'s database.

Code generator 250 includes an introspector 251 and a code filter 252. The introspector 251 is responsible for interrogation of repository 260 and code filter 252 is responsible for generating source code 280. Repository 260 contains all the pertinent information (metadata) required for the integration. Metadata is information that describes the format and content of data stored in repository 260. Interrogation of repository 260 provides the metadata needed to produce source code 280 in the form of an adapter, including any necessary supporting structures. Through the interrogation of repository 260, a canonical form of the selected object (external service) may be produced by introspector 251. The canonical form allows the compression and joining of repository information into a single release to be used by code filter 252.

The following Table 1 shows an example of what business services metadata are used and the information (metadata) obtained form the repository.

*TABLE 1

| Type | Information Obtained |
|---|---|
| Business Services | business service name, activation flags and associated comments. |
| Business Service Method | business service methods name, activation flags, and associated comments. |
| Business Service Method Arg | business service method arguments name, type, usage and comments. |
| Business Service User Props | business service method's user level properties name, type, value and comments. |

The following Table 2 shows one embodiment of what integration objects are used and the information (metadata) obtained from the repository 260:

*TABLE 2

| Siebel Type | Information Obtained |
|---|---|
| Integration Object | integration object name, activation flags and associated comments. |
| Integration Component | integration component name, XML name, activation flags, parent integration component, and comments. |
| Integration Component Field | integration field name, XML name, activation flags, type, and comments. |

The following Table 3 shows the canonical representation of the object (business service from external system 225):

*TABLE 3

| Attribute | Description |
|---|---|
| Class Def | Defines the overall object class contains things like: Version id for the class Derived Repository name Is this class an adapter class to native Environment? Access rights for the class itself package/namespace/ . . . name for the class The name of the class Class level comment (pulled from Tools) Property name for the class, normally the same as the class name An array of super classes names (i.e. who are you derived from) An array of interfaces names you implement An array of attribute declarations (i.e. Declaration definition array) An array of method declarations (i.e. Declaration definition array) Meta data stating if this class cardinality. |
| Method Def | Only exists for Business Services Method name Property name Comment Access rights Array of arguments. Return type |
| Declaration Def | Variable type Variable name |

*TABLE 3-continued

| Attribute | Description |
|---|---|
| | Default value Property Cardinality Access rights Access visibility |

Based on the exemplary attributes of Table 3, multiple language structures and/or environments (i.e. J2EE, C++ Interfaces and C++ Adapters) can be derived. This canonical form (containing each class definition) is passed on to code filter 252.

Code filter 252 uses the canonical form to add in any language/environment dependent idiosyncrasies. Each code filter 252 may be custom built for a given programming language and/or environment. Utilizing this type of implementation allows a code filter 252 to support multiple programming environments concurrently. By way of example only, a JAVA® Code Filter will be described below. All other code filters would be analogous to the JAVA® Code Filter, by adding specific language dependent idiosyncrasies.

In the case of a JAVA® Filter, code filter 252 would convert the canonical form of a business service to a business service adapter (for an external business service of external business system 225) and a set of JAVA® beans. The adapter provides an interface for interacting with the external business service in a strongly typed interface. The adapter utilizes the set of JAVA® beans produced for input and output method arguments. The following Table 4 shows the two methods invoked by code generator 250.

*TABLE 4

| Method Name | Argument | Description |
|---|---|---|
| GetBusObjList | | Generates a list of business objects and key attributes based on some input arguments. |
| | BusinessComponentType | Which type of business component you are wishing to obtain a list for. |
| | RepositoryName | Repository name to introspect. |
| | OutputBusinessObjectList | Return value. |
| GenerateCode | | Generates source code files for a given business object with a given code filter. |
| | BusinessComponentType | Which type of business component you are wishing to obtain a list for. |
| | RepositoryName | Repository name to introspect. |
| | OutputCodeGeneratedList | Return value. |

Figure 3:
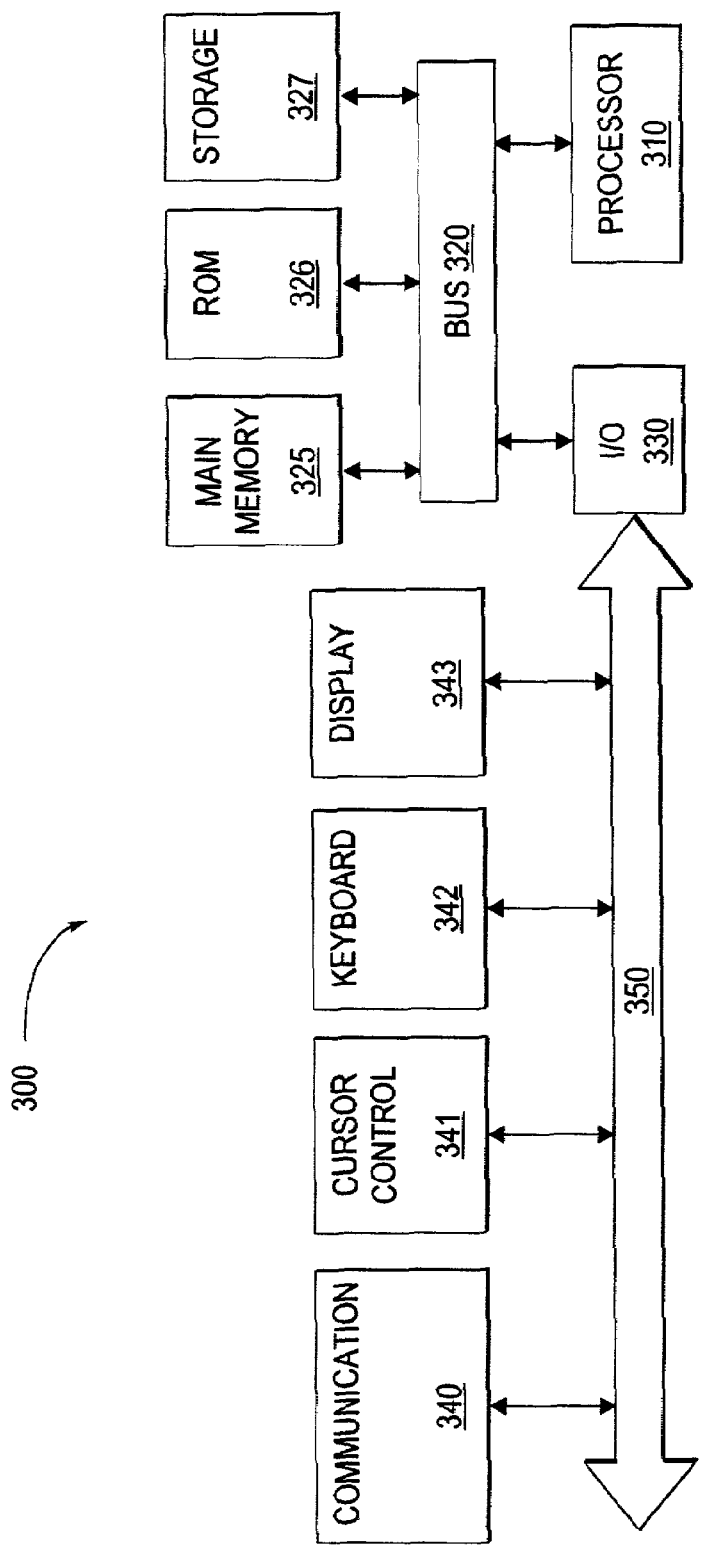
FIG. 3 illustrates a computer system 300 representing an integrated multi-processor, in which elements of the present invention may be implemented.

FIG. 3 illustrates a computer system 300 representing an integrated multi-processor, in which elements of the present invention may be implemented. For example, system 300 may be the architecture of a server running system 200. One embodiment of computer system 300 comprises a system bus 320 for communicating information, and a processor 310 coupled to bus 320 for processing information. Computer system 300 further comprises a random access memory (RAM) or other dynamic storage device 325 (referred to herein as main memory), coupled to bus 320 for storing information and instructions to be executed by processor 310. Main memory 325 also may be used for storing temporary variables or other intermediate information during execution of instructions by processor 310. Computer system 300 also may include a read only memory (ROM) and/or other static storage device 326 coupled to bus 320 for storing static information and instructions used by processor 310. The repository 260 may be implemented in storage 327.

A data storage device 327 such as a magnetic disk or optical disc and its corresponding drive may also be coupled to computer system 300 for storing information and instructions. Computer system 300 can also be coupled to a second I/O bus 350 via an I/O interface 330. A plurality of I/O devices may be coupled to I/O bus 350, including a display device 343, an input device (e.g., an alphanumeric input device 342 and/or a cursor control device 341).

The communication device 340 is for accessing other computers (servers or clients) via a network. The communication device 340 may comprise a modem, a network interface card, or other well known interface device, such as those used for coupling to Ethernet, token ring, or other types of networks.

Figure 4:
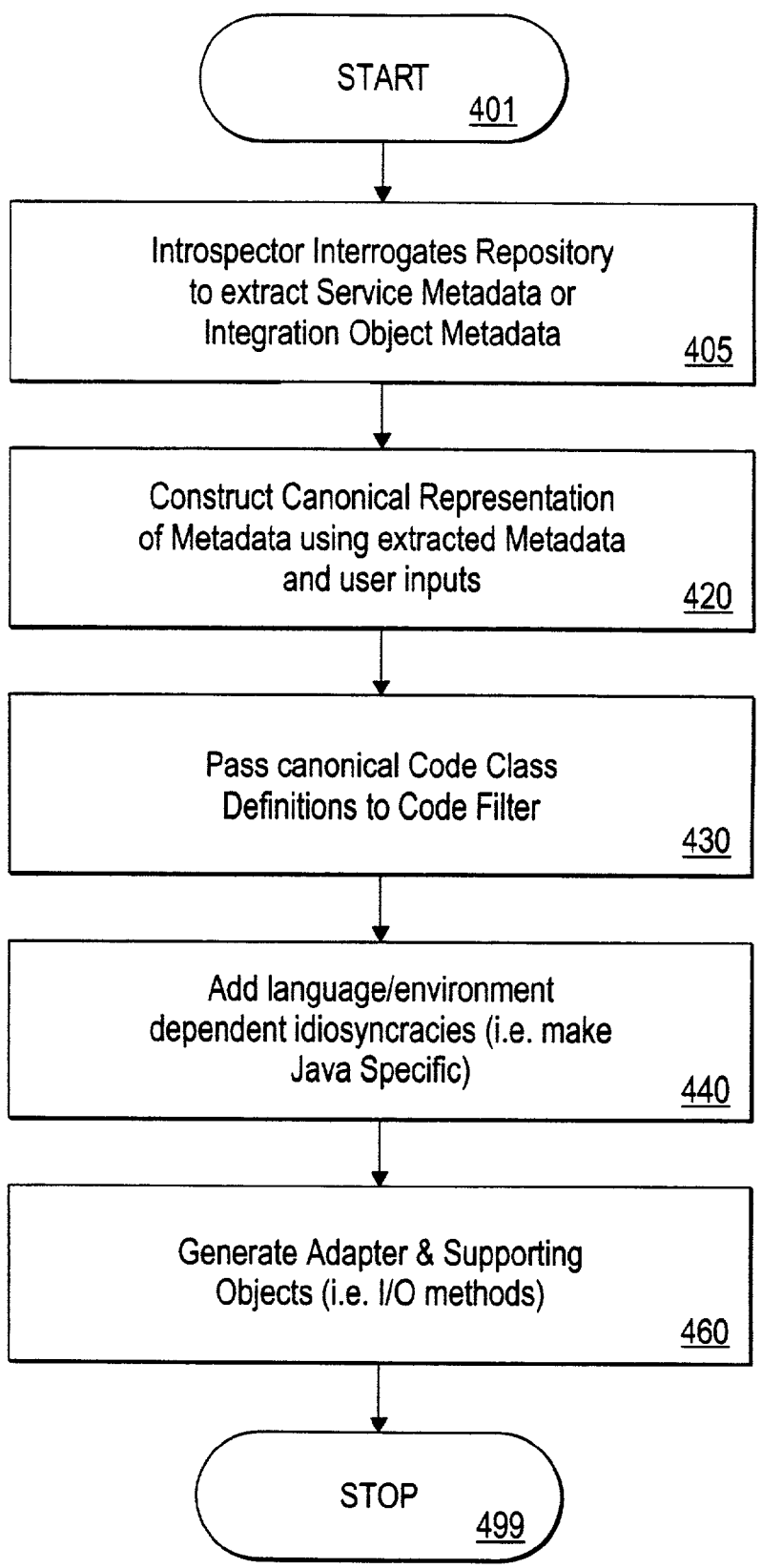
FIG. 4 illustrates an exemplary flow diagram 400 of the processing performed by code generator system 200.

FIG. 4 illustrates an exemplary flow diagram 400 of the processing performed by code generator system 200. The process commences at start block 401. Flow continues to block 405 where introspector 251 interrogates repository 260 to extract metadata. The metadata may be of business services or integration objects for example. User inputs 270 are also accepted by introspector 251, where the user inputs 270 include selection of a method or service of external business system 225.

Flow continues to processing block 420 where a introspector 251 constructs a canonical representation of the metadata by using the extracted metadata and user inputs 270. At processing block 430, the canonical form (or canonical code class definitions) is passed on to code filter 252. Flow continues to process block 440, where code filter 252 adds language/environment dependent idiosyncrasies, for example, specifically for the JAVA® environment. At processing block 460, code filter 252 generates source code 280 that local system 205 integrates into itself as an adapter with supporting mechanisms for the specific language or environment. Flow stops at block 499.

Figure 5:
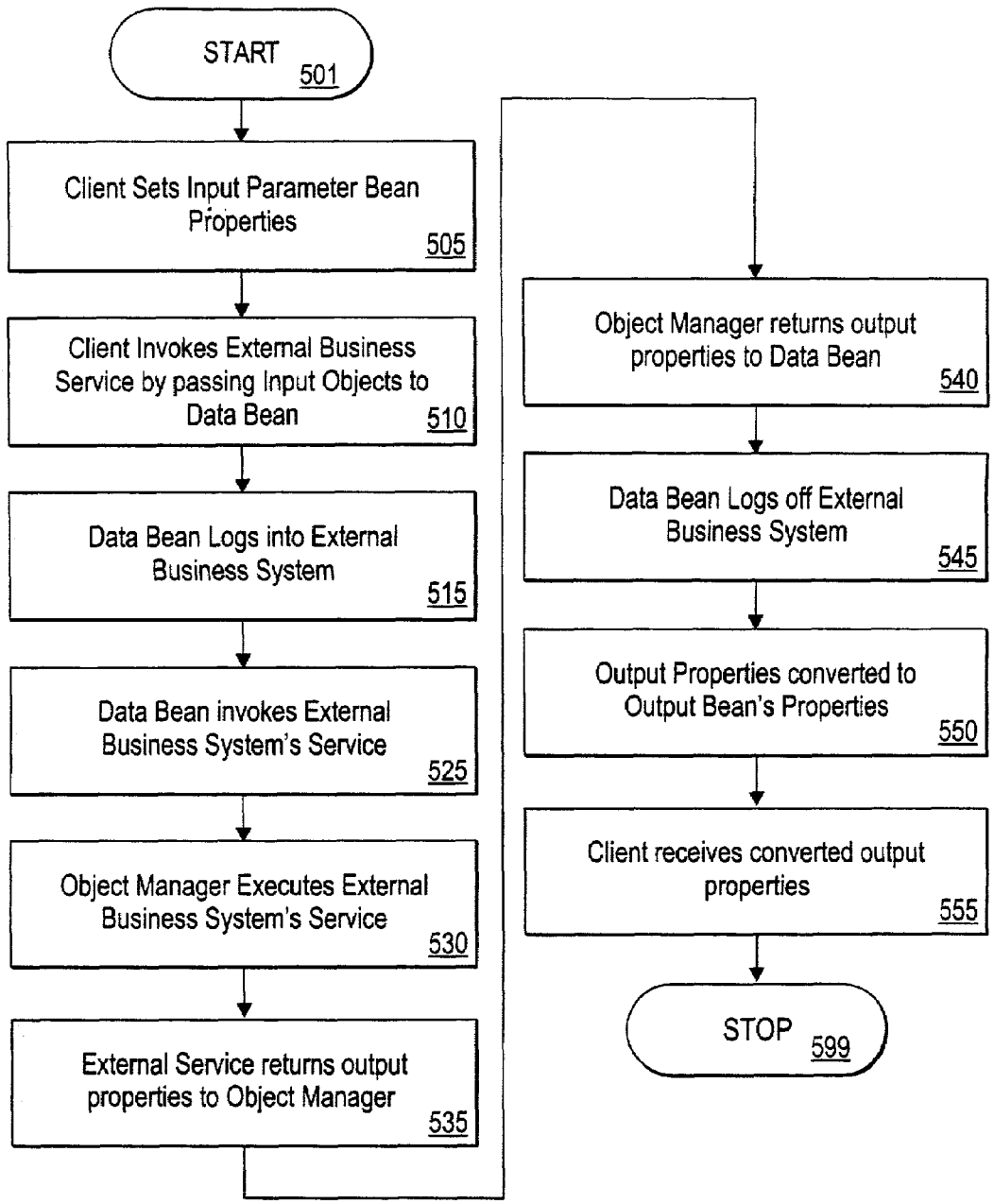
FIG. 5 illustrates an exemplary flow diagram 500 of the processing performed between local system 205 and external system 225.

Having detailed how integration code is generated, the use of generated integration source code within local system 205 will be described. FIG. 5 illustrates an exemplary flow diagram 500 of the processing performed between local system 205 and external system 225. Although described with respect to the JAVA® environment, the processing may be used for any similar environment, or for similar business services.

Process 500 begins at start block 501. Flow continues to processing block 505, where a client of local system 205 sets input parameter bean properties (i.e. selecting a method or service of external system 225). At processing block 510, the client invokes an external business service by passing the input bean to a data bean representing the source code adapter 280. Flow continues to processing block 515, where the data bean logs into external system 525.

At processing block 525, the data bean invokes the external business system's method or service. Flow continues to processing block 530, where an object/method/service manager for external system 525 executes the requested method or service, with the input bean parameters specified. At processing block 535, the executed external service or method returns some output properties to the object/method/service manager.

Flow continues to processing block 540, where the object/method/service manager returns the output properties to the Data Bean. At processing block 545 the Data Bean logs off the external system 225. Flow continues to processing block 550, where the output properties are converted to maintain the format and idiosyncrasies of the output bean's properties. At processing block 555, the client receives the converted output properties by the data bean and flow terminates at block 599.

A method and code generator system for integrating different enterprise business applications is disclosed. Although the present invention has been described with respect to specific examples and subsystems, it will be apparent to those of ordinary skill in the art that the invention is not limited to these specific examples or subsystems but extends to other embodiments as well. The present invention includes all of these other embodiments as specified in the claims that follow.

We claim:

1. A computerized method comprising:
   receiving one or more user inputs that indicate a component of an external business system;
   interrogating a repository, wherein
   the repository is stored on a computer-readable storage medium,
   the repository comprises integration data,
   the interrogating is performed by an introspector of a code generator, and
   the interrogating comprises obtaining, from the repository, information required for an integration of the component of the external business system into a local business system among a plurality of local systems;
   generating a canonical form of the component of the external business system, wherein
   the generating is performed by one or more processors, and
   the generating is based at least in part on the integration data; and
   generating integration source code for a first programming language using the integration data with a first code filter of the code generator, wherein
   the first programming language corresponds to the local business system,
   the first code filter is among a plurality of code filters,
   the plurality of code filters is configured for use with a respective plurality of programming languages,
   the first code filter generates the integration source code for the first programming language using the canonical form of the component of the external business system, and the first code filter adds idiosyncrasies of the local business system to the canonical form of the component of the external business system.

2. The method of claim 1, further comprising:
   providing the introspector with the one or more user inputs.

3. The method of claim 2, wherein one of the user inputs is a requested object, method, or service from the external business system.

4. The method of claim 3, further comprising:
   generating a set of canonical code class definitions from the integration data and user inputs.

5. The method of claim 4, wherein the first code filter adds language or environment dependent idiosyncrasies to the canonical code class definitions.

6. The method of claim 5, further comprising:
   generating an external business service adapter by the first code filter.

7. The method of claim 6, further comprising:
   compiling the service adapter into the local business system.

8. The method of claim 1, further comprising:
generating integration source code for a second programming language using the integration data with a second code filter of the code generator, wherein
the second programming language corresponds to a second local system among the plurality of local systems,
the second code filter is among the plurality of code filters,
the plurality of code filters is configured for use with a respective plurality of programming languages, and
the second code filter generates the integration source code for the second programming language using the canonical form of the component of the external business system.

9. A computerized method comprising:
passing one or more user inputs to an adapter;
generating, using one or more processors, a canonical form of a component of an external business system,
generating source code using the canonical form of the component of the external business system, wherein
the generating is performed by a first code filter,
the first code filter is among a plurality of code filters,
the plurality of code filters is configured for use with a respective plurality of programming languages, the first code filter adds idiosyncrasies of a local business system to the canonical form of the component of the external business system, and
the source code generated by the first code filter is for a first programming language used in a local business system;
integrating the source code into the local business system using information obtained from a repository, wherein the integrating is performed by the local business system;
logging into the external business system by the adapter;
invoking the external business service by the adapter;
executing the external business service by an object manager associated with the external business system;
returning output properties from the external business service to the object manager;
returning the output properties from the object manager to the adapter;
logging off the external business system by the adapter; and
converting the output properties to a format of the local business system.

10. A computerized system comprising:
means for receiving one or more user inputs that indicate a component of an external business system;
means for interrogating a repository, wherein
the repository is stored on a computer-readable storage medium,
the repository comprises integration data,
the interrogating is performed by an introspector of a code generator, and
the interrogating comprises obtaining, from the repository, information required for an integration of the component of the external business system into a local business system;
means for generating a canonical form of the component of the external business system, wherein
the means for generating comprises one or more processors, and
the generating is based at least in part on the integration data; and
means for generating integration source code for a first programming language, wherein the generating the integration source code comprises using the integration data with a first code filter of the code generator,
the first code filter is among a plurality of code filters,
the plurality of code filters is configured for use with a respective plurality of programming languages,
the first code filter is configured to generate the integration source code for the first programming language using the canonical form of the component of the external business system, and the first code filter is configured to add idiosyncrasies of the local business system to the canonical form of the component of the external business system.

11. The system of claim 10, further comprising:
means for providing the introspector with the one or more user inputs.

12. The system of claim 11, wherein one of the user inputs is a requested object, method, or service from the external business system.

13. The system of claim 12, further comprising:
means for generating a set of canonical code class definitions from the integration data and user inputs.

14. The system of claim 13, wherein the first code filter adds language or environment dependent idiosyncrasies to the canonical code class definitions.

15. The system of claim 14, further comprising:
means for generating an external business service adapter by the first code filter.

16. The system of claim 15, further comprising:
means for compiling the service adapter into the local business system.

17. A computerized system comprising:
means for passing one or more user inputs to an adapter;
one or more processors configured to generate a canonical form of a component of an external business system from the integration data and user inputs,
means for generating source code using the canonical form of the component of the external business system, wherein
the generating the source code is performed by a first code filter,
the first code filter is among a plurality of code filters,
the plurality of code filters is configured for use with a respective plurality of programming languages, the first code filter is configured to add idiosyncrasies of a local business system to the canonical form of the component of the external business system, and
the source code generated by the first code filter is for a first programming language used in the local business system;
means for integrating the source code into the local business system using information obtained from a repository, wherein the integrating is performed by the local business system;
means for logging into the external business system by the adapter;
means for invoking the external business service by the adapter;
means for executing the external business service by an object manager associated with the external business system;
means for returning output properties from the external business service to the object manager;
means for returning the output properties from the object manager to the adapter;
means for logging off the external business system by the adapter; and means for converting the output properties to a format of the local business system.

18. A computer-readable storage medium having stored thereon a plurality of instructions, which when executed by a computer, cause the computer to perform:
receiving one or more user inputs that indicate a component of an external business system;
interrogating a repository, wherein
the repository is stored on a computer-readable storage medium,
the repository comprises integration data,
the interrogating is performed by an introspector of a code generator, and
the interrogating comprises obtaining, from the repository, information required for an integration of the component of the external business system into a local business system;
generating a canonical form of the component of the external business system, wherein
the generating is performed by one or more processors, and
the generating is based at least in part on the integration data; and
generating integration source code for a first programming language using the integration data with a first code filter of the code generator, wherein
the first code filter is among a plurality of code filters,
the plurality of code filters is configured for use with a respective plurality of programming languages, the first code filter adds idiosyncrasies of the local business system to the canonical form of the component of the external business system, and
the first code filter generates his integration source code for the first programming language using the canonical form of the component of the external business system.

19. The computer-readable storage medium of claim 18, wherein the plurality of instructions, when executed by the computer, cause the computer to further perform:
providing the introspector with the one or more user inputs.

20. The computer-readable storage medium of claim 19, wherein one of the user inputs is a requested object, method, or service from the external business system.

21. The computer-readable storage medium of claim 20, wherein the plurality of instructions, when executed by the computer, cause the computer to further perform:
generating a set of canonical code class definitions from the integration data and user inputs.

22. The computer-readable storage medium of claim 21, wherein the first code filter adds language or environment dependent idiosyncrasies to the canonical code class definitions.

23. The computer-readable storage medium of claim 22, wherein the plurality of instructions, when executed by the computer, cause the computer to further perform:
generating an external business service adapter by the first code filter.

24. The computer-readable storage medium of claim 23, wherein the plurality of instructions, when executed by the computer, cause the computer to further perform:
compiling the service adapter into the local business system.

25. A computer-readable storage medium having stored thereon a plurality of instructions, wherein the plurality of instructions when executed by a computer cause the computer to perform:
passing one or more user inputs to an adapter;
generating, using one or more processors, a canonical form of a component of an external business system from the integration data and user inputs,
generating source code using the canonical form of the component of the external business system, wherein
the generating is performed by a first code filter,
the first code filter is among a plurality of code filters,
the plurality of code filters is configured for use with a respective plurality of programming languages, the first code filter adds idiosyncrasies of a local business system to the canonical form of the component of the external business system, and
the source code generated by the first code filter is for a first programming language used in the local business system;
integrating the source code into the local business system using information obtained from a repository, wherein the integrating is performed by the local business system;
logging into the external business system by the adapter;
invoking the external business service by the adapter;
executing the external business service by an object manager associated with the external business system;
returning output properties from the external business service to the object manager;
returning the output properties from the object manager to the adapter;
logging off the external business system by the adapter; and
converting the output properties to a format of the local business system.

26. A computerized system comprising:
a code generator comprising an introspector and a first code filter, of a plurality of code filters, wherein
the plurality of code filters is configured for use with a respective plurality of programming languages, and
the plurality of code filters is configured to generate integration source code for a first programming language using one or more user inputs;
a repository coupled to the code generator, wherein the repository stores integration data associated with an external business system; and
a local business system coupled to the code generator, wherein
the introspector is configured to interrogate the repository for integration data associated with an external business service,
the introspector comprises one or more processors configured to generate a set of canonical forms of a component of the external business system from the integration data, and the first code filter is configured to add idiosyncrasies of the local business system to the set of canonical forms of the component of the external business system.

27. The system of claim 26, wherein the first code filter generates integration source code, and the integration source code is compiled into the local business system to seamlessly provide access to the external business service.

28. A method comprising:
receiving a user input that identifies a component of an external computing system;

obtaining from a repository, in response to the user input, information required for an integration of the component into a first local computing system and a second local computing system;

generating a canonical form of an adapter for the component in response to the information required for the integration of the component into the first and second local computing systems;

converting the canonical form of the adapter into a first implementation-specific form of the adapter suitable for the first local computing system; and converting the canonical form of the adapter into a second implementation-specific form of the adapter suitable for the second local computing system, wherein the converting the canonical form of the adapter into the first implementation-specific form of the adapter comprises adding idiosyncrasies of the first local computing system to the canonical form of the adapter, and the converting the canonical form of the adapter into the second implementation-specific form of the adapter comprises adding idiosyncrasies of the second local computing system to the canonical form of the adapter.

29. The method of claim 28, wherein the first implementation-specific form of the adapter is configured for use with a first programming language, and the second implementation-specific form of the adapter is configured for use with a second programming language that is different from the first programming language.

30. The method of claim 28, wherein the first implementation-specific form of the adapter is configured for use with a first programming environment, and the second implementation-specific form of the adapter is configured for use with a second programming environment that is different from the first programming environment.

31. The method of claim 28, wherein the canonical form of the adapter comprises a class definition and a declaration definition.

32. The method of claim 31, wherein the class definition comprises indicators of super classes from which the class definition is derived.

33. The method of claim 31, wherein:
the class definition comprises access rights for a class defined by the class definition; and the first implementation-specific form of the adapter is a Java implementation.

34. The method of claim 28, wherein:
the first implementation-specific form of the adapter is a Java implementation; and
the second implementation-specific form of the adapter is a C++ implementation.

35. The method of claim 28, wherein the component of the external computing system is a service of the external computing system.

36. The method of claim 28, wherein:
the first implementation-specific form of the adapter is configured for use with:
a first programming language, and
a first programming environment; and
the second implementation-specific form of the adapter is configured for use with:
a second programming language that is different from the first programming language, and
a second programming environment that is different from the first programming environment.

37. The method of claim 28, wherein:
the first implementation-specific form of the adapter comprises
a first implementation-specific form of an external application adapter, configured to communicate with an integration interface of the external computing system, and
a first implementation-specific form of an internal application adapter, coupled to the first implementation-specific form of the external application adapter, and configured to communicate with an internal object layer of the first local computing system; and
the second implementation-specific form of the adapter comprises
a second implementation-specific form of the external application adapter, configured to communicate with the integration interface of the external computing system, and
a second implementation-specific form of the internal application adapter, coupled to the second implementation-specific form of the external application adapter, and configured to communicate with an internal object layer of the second local computing system.

* * * * *

UNITED STATES PATENT AND TRADEMARK OFFICE
CERTIFICATE OF CORRECTION

| | | |
|---|---|---|
| PATENT NO. | : 7,685,562 B2 | |
| APPLICATION NO. | : 10/120031 | |
| DATED | : March 23, 2010 | |
| INVENTOR(S) | : William Bruce Kilgore et al. | |

It is certified that error appears in the above-identified patent and that said Letters Patent is hereby corrected as shown below:

In column 4, line 29, delete "addition an" and insert -- addition, any --, therefor.

In column 4, line 34, before "business" insert -- local --.

In column 7, line 29, delete "a" and insert -- an --, therefor.

In column 9, line 29, in Claim 9, delete "in a" and insert -- in the --, therefor.

In column 11, line 34, in Claim 18, delete "his" and insert -- the --, therefor.

In column 12, line 6, in Claim 25, delete "inputs," and insert -- inputs; --, therefor.

In column 12, line 54, in Claim 26, delete "processors" and insert -- processors, --, therefor.

Signed and Sealed this
First Day of March, 2011

David J. Kappos
*Director of the United States Patent and Trademark Office*